United States Patent
Glover et al.

(10) Patent No.: US 9,923,958 B1
(45) Date of Patent: Mar. 20, 2018

(54) HIGHLY AVAILABLE NETWORK FILER WITH AUTOMATIC LOAD BALANCING AND PERFORMANCE ADJUSTMENT

(71) Applicant: Oracle International Corporation, Redwood Shores, CA (US)

(72) Inventors: Frederick S. Glover, Hollis, NH (US); George Sanderson, Francetown, NH (US); Donald Allan Graves, Jr., Manchester, NH (US)

(73) Assignee: Oracle International Corporation, Redwood Shore, CA (US)

( * ) Notice: Subject to any disclaimer, the term of this patent is extended or adjusted under 35 U.S.C. 154(b) by 0 days.

(21) Appl. No.: 15/804,203

(22) Filed: Nov. 6, 2017

Related U.S. Application Data (63) Continuation of application No. 13/277,910, filed on Oct. 20, 2011, now Pat. No. 9,813,491.

(51) Int. Cl.
*G06F 15/16* (2006.01)
*H04L 29/08* (2006.01)
*G06F 9/50* (2006.01)

(52) U.S. Cl.
CPC ........ *H04L 67/1002* (2013.01); *G06F 9/5083* (2013.01)

(58) Field of Classification Search
CPC .................... H04L 67/1002; G06F 9/5083
USPC ................................................ 709/217
See application file for complete search history.

(56) References Cited

U.S. PATENT DOCUMENTS

| | | | |
|---|---|---|---|
| 6,397,255 B1 | 5/2002 | Nurenberg | |
| 6,944,785 B2 | 9/2005 | Gadir et al. | |
| 7,089,293 B2 | 8/2006 | Grosner et al. | |
| 7,480,737 B2 | 1/2009 | Chauffour | |
| 7,574,499 B1 | 8/2009 | Swildens et al. | |
| 8,417,678 B2 | 4/2013 | Bone et al. | |
| 8,463,788 B2 | 6/2013 | Bandyopadhyay et al. | |
| 2003/0126200 A1 | 7/2003 | Wolff | |
| 2004/0243709 A1 | 12/2004 | Kalyanavarathan et al. | |
| 2004/0260745 A1 | 12/2004 | Gage et al. | |
| 2005/0273571 A1 | 12/2005 | Lyon | |
| 2007/0192444 A1 | 8/2007 | Ackauy et al. | |
| 2008/0215718 A1 | 9/2008 | Stolorz et al. | |
| 2008/0256183 A1 | 10/2008 | Flynn et al. | |
| 2010/0030839 A1* | 2/2010 | Ceragioli | H04L 63/20 709/201 |
| 2010/0332664 A1 | 12/2010 | Yevmenkin et al. | |

(Continued)

OTHER PUBLICATIONS

U.S. Appl. No. 13/277,910, filed Oct. 20, 2011, Office Action dated Dec. 19, 2014.

(Continued)

*Primary Examiner* — S M Rahman
(74) *Attorney, Agent, or Firm* — Hickman Palermo Becker Bingham LLP; Daniel D. Ledesma (57) ABSTRACT

Techniques are provided for exporting one or more file systems through multiple nodes of a cluster. One or more of the exported file systems may be simultaneously exported through a single node of the cluster. A bundle, or mapping, between a node in the cluster and a file system, is created. The bundle represents an amount of work assigned to the node. A bundle is reassigned from one node to another node in the cluster in response to a failover, an addition of a new node to the cluster, or in response to a load balancing determination.

20 Claims, 6 Drawing Sheets

(56) References Cited

U.S. PATENT DOCUMENTS

| | | | |
|---|---|---|---|
| 2011/0310864 A1* | 12/2011 | Gage | H04L 45/02 370/338 |
| 2012/0042084 A1* | 2/2012 | Dutta | H04L 65/1016 709/228 |
| 2013/0054806 A1* | 2/2013 | Francis | H04L 67/1002 709/226 |
| 2017/0097941 A1 | 4/2017 | Graves et al. | |

OTHER PUBLICATIONS

U.S. Appl. No. 13/277,910, filed Oct. 20, 2011, Office Action dated Jul. 15, 2015.
U.S. Appl. No. 13/277,910, filed Oct. 20, 2011, Office Action dated Jun. 23, 2014.
U.S. Appl. No. 13/277,910, filed Oct. 20, 2011, Final Office Action dated Aug. 6, 2013.
U.S. Appl. No. 13/277,910, filed Oct. 20, 2011, Office Action dated Apr. 25, 2013.
U.S. Appl. No. 13/277,910, filed Oct. 20, 2011, Final Office Action dated Feb. 5, 2016.
U.S. Appl. No. 13/277,910, filed Oct. 20, 2011, Advisory Action dated Oct. 30, 2013.
Glover, U.S. Appl. No. 13/277,910, filed Oct. 20, 2011, Office Action dated Dec. 16, 2016.
Glover, U.S. Appl. No. 13/277,910, filed Oct. 20, 2011, Notice of Allowance dated Jun. 22, 2017.

* cited by examiner

FIG. 6

HIGHLY AVAILABLE NETWORK FILER WITH AUTOMATIC LOAD BALANCING AND PERFORMANCE ADJUSTMENT

CROSS-REFERENCE TO RELATED APPLICATIONS, BENEFIT CLAIM

This application claims the benefit as a Continuation of application Ser. No. 13/277,910, filed Oct. 20, 2011 the entire contents of which is hereby incorporated by reference as if fully set forth herein, under 35 U.S.C. § 120. The applicant hereby rescind any disclaimer of claim scope in the parent application(s) or the prosecution history thereof and advise the USPTO that the claims in this application may be broader than any claim in the parent application.

FIELD OF THE INVENTION

The present invention relates to file systems and, more particularly, to managing a cluster of nodes that export one or more file systems.

BACKGROUND

Since the Network File System (NFS) protocol was developed in 1984, users of client devices have been able to access files over a network in a manner similar to how local storage is accessed. A basic premise behind NFS is a simple client/server model. Directories on an NFS server are shared, an NFS client mounts those directories, and then it appears to the user(s) on the client machine as just another file system.

The following is an example of a typical Unix-style scenario in which one machine (the client) requires access to data stored on another machine (the NFS server). First, the NFS server implements NFS daemon processes (running by default as nfsd) in order to make its data generically available to clients. Second, an administrator determines what data to make available by exporting the names and parameters of directories (typically using the /etc/exports configuration file and the exports command). Third, security administration of the NFS server ensures that it can recognize and approve validated clients. Fourth, network configuration of the NFS server ensures that appropriate clients can negotiate with the NFS server through any firewall system. Fifth, a client machine requests access to exported data, typically by issuing a mount command. This step may involve the NFS client asking the NFS server (using nfsd) which port the NFS server is using, the NFS client connecting to the NFS server (using nfsd), and nfsd passing the request to mountd. If each step succeeds, users of the client machine can then view and interact with mounted file systems on the NFS server within the parameters permitted.

Current network file servers export file systems to many clients. These file systems are limited in availability in that, when a node serving the file system goes down, no new requests are serviced until the node comes back up and begins to serve the file system again. In one possible approach for providing a high available network file system, two nodes each serve different file systems. If one node goes down, then the other node assumes the export of the failed node's file system(s). However, a NFS client must be configured to mount the same file system through multiple nodes. This is referred to as "multiple mount points." In this way, a NFS client must be configured to know when a node goes down in order to attempt accessing the same data through another mount point (i.e., the other node).

In addition, nodes can easily get overloaded processing I/O from clients. Since I/O may take over the system, using all available network and storage bandwidth, other clients may find themselves starved for I/O, waiting for small windows of time to get the information they need back from the network file server. There are no known highly available solutions that provide performance adjustment and load balancing.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are provided for a cluster of nodes processing file system requests that target one or more file systems exported by the cluster. Each node in the cluster is assigned zero or more bundles, each of which represents an amount of work. A bundle is an association between a cluster node and a file system. In one implementation, a single node of the cluster receives all file system requests that target any file system exported by the cluster. The single node routes a file system request to one of the cluster nodes based on one or more factors, such as current load, which may be reflected in the number of bundles assigned to each node in the cluster. In another implementation, file system requests are sent to cluster nodes without going through an intermediate node in the cluster that is responsible for routing the requests. The load on each cluster node may be managed by causing a (e.g., DNS) mapping to be updated so that future file system requests that would have been sent to a particular cluster node are instead sent to another node in the cluster. Also, in a failover scenario, future requests that target the failed node are sent to a surviving node.

Embodiments of the invention are not limited to any particular network file system protocol. Non-limiting examples of network file system protocols include NFS (Network File System), GFS (Google File System), and CIFS (Common Internet File System), also known as Server Message Block (SMB).

SINGLE NAMESPACE

According to an embodiment of the invention, a cluster of nodes is associated with a single namespace. In other words, client devices access one or more file systems that are exported by the cluster of nodes as if the client devices are interacting with a single node. The fact that there are a cluster of nodes that are managing file system requests is transparent to the client devices. Thus, each file system exported by the cluster of nodes (there may be only one file system) is accessed through a single logical (e.g., IP) address. A client device may determine the logical address through a DNS lookup, which resolves a hostname of the cluster into a logical address. Each file system request from that client device is sent using that logical address as the destination, regardless of how many nodes are currently in the cluster, how many nodes have been removed from the cluster, and how many nodes have been added to the cluster.

Figure 1:
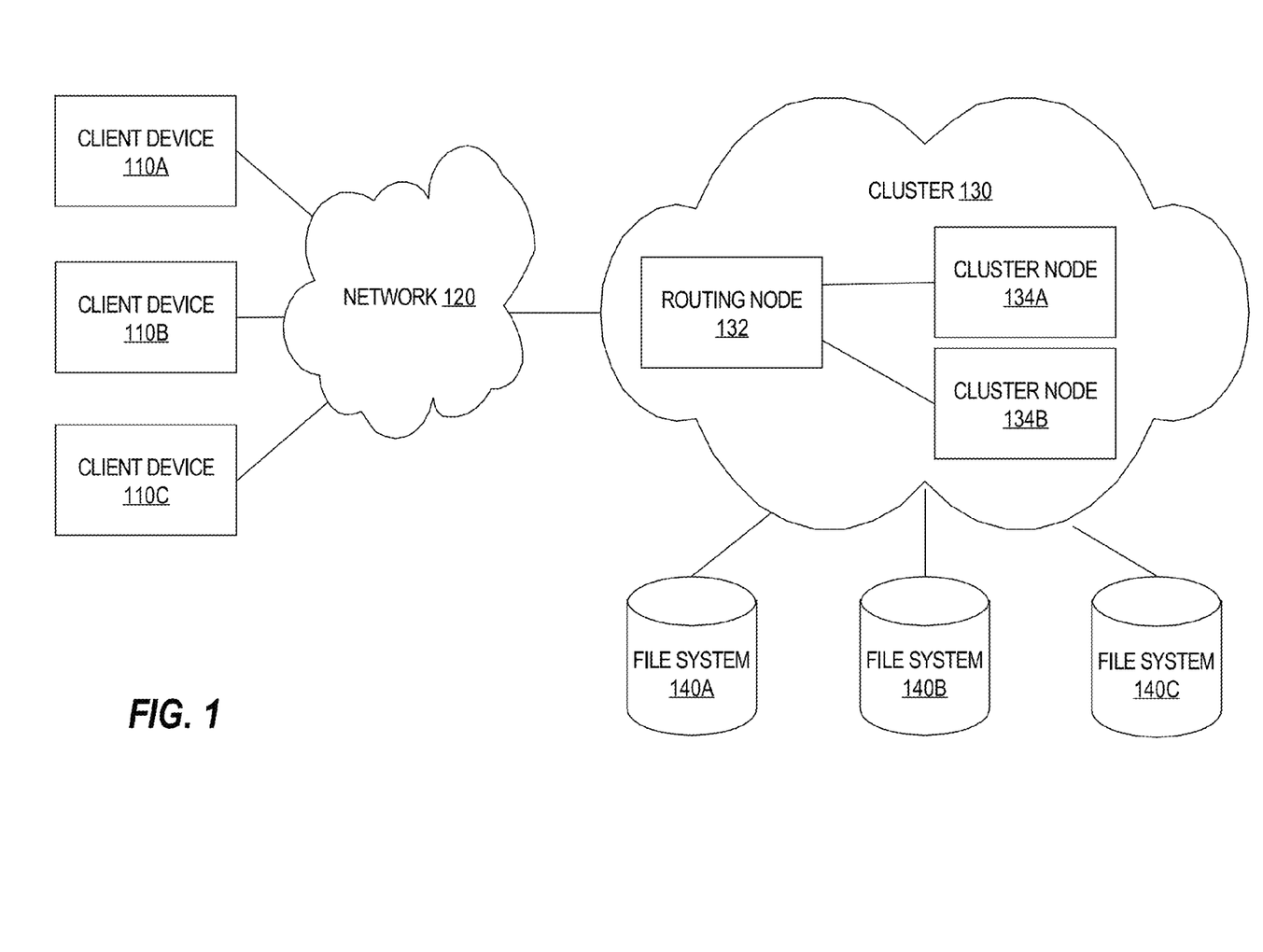
FIG. 1 is a block diagram that depicts an example file system architecture, according to an embodiment of the invention.

FIG. 1 is a block diagram that depicts an example file system architecture 100, according to an embodiment of the invention. File system architecture 100 comprises client devices 110A-C, network 120, cluster 130, and file systems 140A-C. Although only three client devices 110A-C are depicted, other embodiments of the invention may include more or less than three. Similarly, although only three file systems 140A-C are depicted, other embodiments of the invention may include more or less than three.

Client devices 110A-C are configured to generate and transmit file system requests that are sent over network 120 and directed to cluster 130 and processed against one or more of file systems 140A-C. Common file system requests are read and write requests. One or more client applications might execute on each of client devices 110A-C. Such client applications initiate the file system requests, which are generated by a file system client (e.g., NFS client) executing on a client device and sent to cluster 130.

Network 120 may be implemented by any medium or mechanism that provides for the exchange of data between client devices 110A-C and cluster 130 of FIG. 1. Examples of a network include, without limitation, a network such as a Local Area Network (LAN), Wide Area Network (WAN), Ethernet or the Internet, or one or more terrestrial, satellite or wireless links.

Cluster 130 includes routing node 132 and cluster nodes 134A-B. Although only two cluster nodes 134A-B are depicted, other embodiments of the invention may include more than two. Each of cluster nodes 134A-B includes one or more processors and memory. Also, each of cluster nodes 134A-B executes at least one file system server that is configured to export one or more of file systems 140A-C, receive file system requests from routing node 132, and access data that is stored in the file system(s) it exports. For ease of explanation, it is presumed that each of cluster nodes 134A-B executes a single file system server and that the actions that are performed by a file system server are attributed to the cluster node that executes the corresponding file system server.

If cluster 130 supports multiple file system protocols, then each cluster node would need to run multiple processes (e.g., one process per protocol) in order to service requests conforming to those protocols. For example, if cluster 130 supports CIFS and NFS, then each of cluster nodes 134A-B would execute an SMB process and a NFSD process. However, routing node 132 is not required to run multiple processes. This is because routing typically occurs at a lower level than the servicing of file system protocols. Routing node 132 only needs to examine an in-coming packet in order to direct the packet to the proper cluster node. The packet indicates the file system and an export type.

At least one of file systems 140A-C is exported through multiple nodes in cluster nodes 134A-B. In other words, multiple cluster nodes 134A-B are configured to access one or more of file systems 140A-C.

In an embodiment, each of file systems 140A-C includes one or more storage disks. In a related embodiment, a single storage disk is partitioned such that at least two of file systems is assigned to a different partition of the storage disk.

Each file system request that targets one of file systems 140A-C (that are exported by cluster 130) is sent to routing node 132 (as opposed to any of cluster nodes 134A-B, each of which may be associated with different logical addresses). Although depicted as a node or computing device that is separate from cluster nodes 134A-B, routing node 132 may include the same functionality as one of cluster nodes 134A-B. Routing node 132 is also different than each of cluster nodes 134A-B in that routing node 132 routes a client request to one of multiple nodes in the cluster based on one or more criteria or factors (e.g., current load of each node in cluster nodes 134A-B).

In an embodiment, if routing node 132 is "removed" from the cluster 130 (e.g., routing node 132 crashes, loses power, or is shut down), then another node in the cluster 130 takes over the role of routing node. The other node in cluster 130 may be one of cluster nodes 134A-B or a separate "standby" node that assumes the role of routing node 132.

Routing node 132 is associated with hostname, referred to herein as a "cluster hostname." The cluster hostname represents the hostname of cluster 130, even though cluster 130 includes multiple nodes. Client devices 110A-C might discover a logical address (referred to hereinafter as the "cluster address") of routing node 132 through a DNS lookup request. Client devices 110A-C treat the cluster address as the logical address of a node that exports each of file systems 140A-C. After discovering the cluster address, client devices 110A-C send file systems requests that include the cluster address as the destination address. Network 120 routes the file system requests to routing node 132, which is associated (e.g., in an ARP table) with the cluster address.

In order for a client device to discover a file system in which to mount, an administrator might define a series of mount points on a server and pre-configure each client to access a file system via a node name (e.g., cluster hostname) and the exported location (protocol dependent, but for NFS would be a directory). "Discovery" that does not require configuration may be performed in multiple ways. Embodiments of the invention are not limited to any particular technique that is used by a client device to discover a file system.

BUNDLES

The amount of "work" assigned to each node in a cluster (e.g., cluster nodes 134A-B in cluster 130) is referred to herein as a "bundle." In the single namespace context, a "bundle" is represented by a mapping or an association between one of cluster nodes 134A-B and a file system. A bundle may be thought of as a duple: <CNID, FSID>, where "CNID" refers to "cluster node identifier" which identifies one of cluster nodes 134A-B and "FSID" refers to "file system identifier" which identifies one of file systems 140A-C exported by cluster 130.

In a related embodiment, a bundle also includes a file system protocol (referred to as an "export"). Two file system requests may target the same file system but use a different export or file system protocol. Thus, a bundle may be thought of as a tuple: <CNID, export, FSID>. Bundles may be duples if cluster nodes 134A-B only support a single file system protocol.

Thus, a bundle represents an assignment of work to a cluster node. For example, two bundles may be assigned to cluster node 134A while five bundles may be assigned to cluster node 134B.

In an embodiment, each of cluster nodes 134A-B is associated with a virtual address (referred to herein as a "VIP"). The address is "virtual" because the assignment of a VIP to one cluster node may change. For example, cluster node 134A may be associated with a particular VIP at time 10. Later, at time 20, the particular VIP is assigned to cluster node 134B. Thus, each file system request sent to the particular VIP after time 20 would be routed to cluster node 134B, instead of cluster node 134A. In this embodiment, a bundle may be an association between a VIP and a file system. Thus, instead of or in addition to a CNID, a bundle may include a VIP.

The assignment of bundles is performed by bundle management software executing on routing node 132 or at least a subset of cluster nodes 134A-B. The bundle management software is configured to make intelligent decisions regarding load balancing, performance tuning, and responding to the removal and addition of a node from/to cluster 130.

If bundles are represented by duples, then a bundle may be considered "active" if the corresponding file system is the target of one or more recent file system requests. For example, if cluster 130 receives a file system request for file system 140A within a certain period of time (e.g., 30 seconds), then the bundle associated with file system 140A is considered active. As another example, cluster 130 must receive at least two file system requests for file system 140A within a certain period of time (e.g., 90 seconds) in order for file system 140A to be considered active. Because many file system protocols are stateless, an aging scheme may be used to determine "activeness." For example, recent requests might increase an activity count and slowly "age" until those requests no longer count against a bundle's activity load. Such a scenario handles cases where a file system has a client that is not accessing the file system, but might in the future.

Similarly, if bundles are represented by tuples, then a bundle may be considered "active" if the corresponding file system in combination with the corresponding export are used frequently in recent file system requests.

ROUTING A FILE SYSTEM REQUEST

Figure 2:
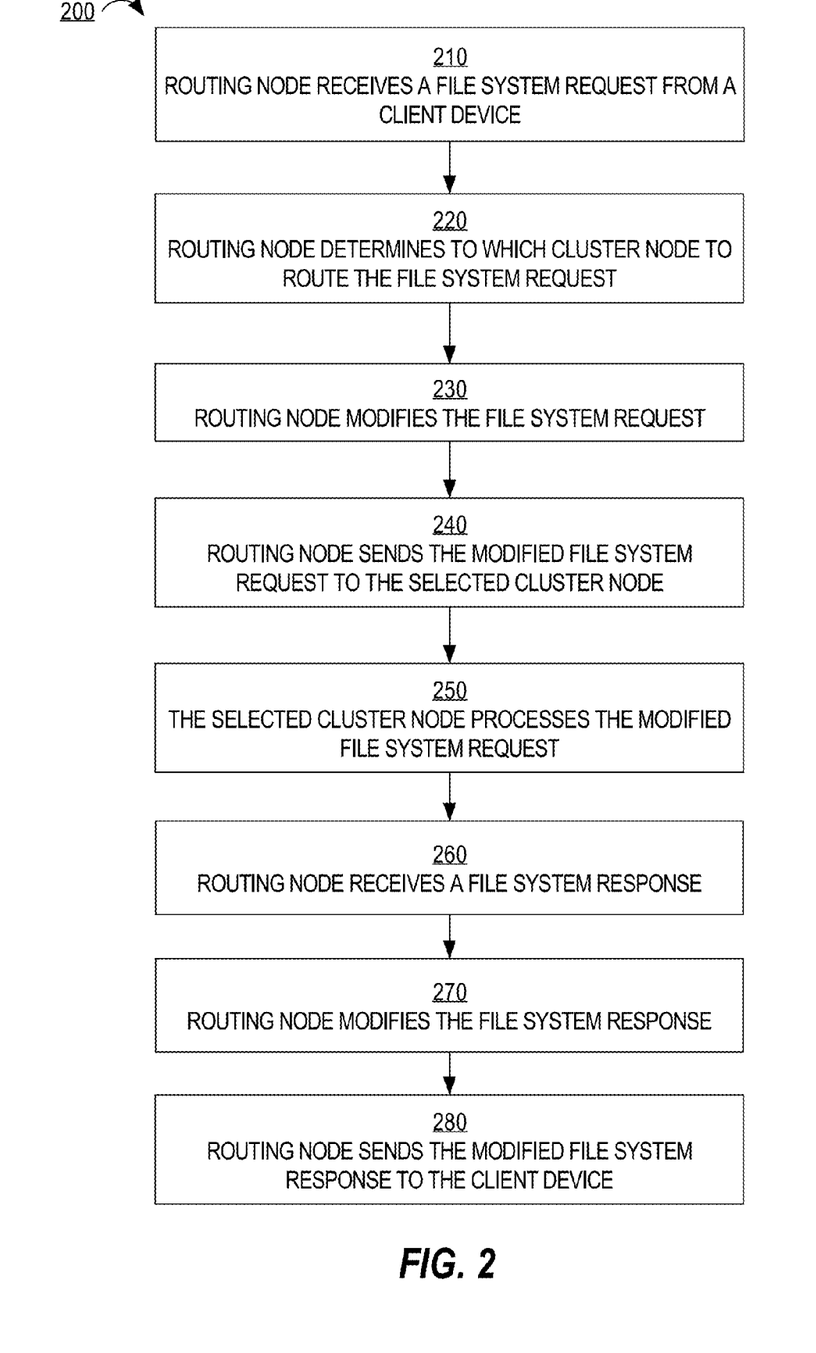
FIG. 2 is a flow diagram that depicts a process for processing a file system request, according to an embodiment of the invention.

FIG. 2 is a flow diagram that depicts a process 200 for processing a file system request, according to an embodiment of the invention. At step 210, routing node 132 receives a file system request from a client device (e.g., client device 110A).

At step 220, in response to receiving the file system request, routing node 132 determines to one of cluster nodes 134A-B to route the file system request. In the case of bundles represented by duples, this determination may involve determining which file system is identified in the file system request. If bundles are represented by tuples, then this determination may additionally involve determining the export of file system protocol, which is indicated by the file system request.

Routing node 132 selects one of cluster nodes 134A-B to route the file system request based on one or more criteria or factors. Non-limiting examples of such criteria include cache considerations (e.g., whether a particular node in cluster nodes 134A-B has already processed a file system request that is from the same client device and that targets the same file system), the current load of each of cluster nodes 134A-B, the type of file system request(s) each of cluster node 134A-B is processing and/or queuing, the type of client application that initiated the file system request(s), whether a cluster node is experiencing or experienced critical storage failures, and/or the type of storage attached to the cluster node (e.g., direct, network, SSD, etc.). Current load of one of cluster nodes 134A-B may include one or more of the following: the number of bundles (or "active" bundles) assigned to the cluster node, CPU usage of the cluster node, memory usage of the cluster node, I/O usage of the cluster node, the number of file systems exported by the cluster node, or the number of file system requests that are queued up by the cluster node.

Statistics about current load may be received by routing node 132 in multiple ways. For example, each of cluster nodes 134A-B may be configured to automatically and regularly (e.g., every 5 seconds) transmit such statistics to routing node 132. As another example, routing node 132 receives statistics only after issuing requests for such statistics to each cluster node 134A-B. Such requests may be sent in response to routing node 132 receiving a new file system request. Additionally, such requests may be sent only in response to routing node 132 receiving a file system request that is not part of any bundle.

If caching is considered, then each subsequent file system request (after an initial file system request) from a particular client device is more likely to be routed to the cluster node that processed the initial file system request, even though that cluster node may have a higher current load relative to other cluster nodes in cluster 130. One reason is that there is an efficiency cost when routing a file system request to another cluster node. The "initial" cluster node might have, stored in its cache, information that is needed to respond to the file system request. If another cluster node receives the file system request, then that other cluster node may have to (a) request information from the initial cluster node or (b) (1) wait for the initial cluster node to flush its cache to disk (i.e., one or more of the file systems) and then (2) request data from disk. Both of these alternatives are costly in terms of time and resources. These alternatives are referred to as "invalidating" a node's cache." The "cache" cost (in terms of time and resource usage) may be estimated and used in the cluster node selection step of 220.

At step 230, prior to routing the file system request to one of cluster nodes 134A-B selected in step 220, routing node 132 might alter the file system request such that the file system request appears, to the selected cluster node, to originate from routing node 132. For example, routing node 132 replaces (1) the source address indicated in the file system request with an address (e.g., IP or MAC address) of routing node 132 and (2) the destination address indicated in the file system request with an address associated with the selected cluster node. Such an alteration is performed so that the cluster node presumes that routing node 132 is the "client" and the code for responding to file system requests does not need to change. Such an alteration takes advantage of routing tables and standard protocols. The client sees the request as coming from the routing node and the cluster node sees the request as coming from the routing node. This allows the packet to be changed from the public to the private network (which may be orders of magnitude faster), as well as to provide for the masquerading necessary to "fool" the client. Such an arrangement also provides for a level of security that is not there if all requests were public.

At step 240, routing node 132 sends the (modified) file system request to the selected cluster node. At this point, the file system request is considered to be in the "private network."

At step 250, the selected cluster node receives and processes the file system request (e.g., by requesting data from one of file systems 140A-C) and generates a file system response.

At step 260, routing node 132 receives the file system response from the selected cluster node.

At step 270, routing node 132 modifies the file system response such that the file system response appears, to the client device that sent the file system request, to be from routing node 132 instead of from the selected cluster node. For example, routing node 132 replaces (1) the source address indicated in the file system response with an address (e.g., IP address) associated with routing node 132 and (2) the destination address indicated in the file system response with an address associated with the client device that sent the file system request received in step 210.

At step 280, routing node 132 sends the (modified) file system response to the client device that sent the file system request.

CHANGING THE NUMBER OF NODES IN THE CLUSTER

Because routing node 132 is the "face" of the cluster in that all file system requests from client devices are directed to routing node 132 and the cluster "behind" routing node 132 is transparent (or invisible) to those client devices, the number of nodes in cluster 130 can change without any modifications to the client devices or to the routing logic of routing node 132. Furthermore, cluster 130 does not have be taken offline in order to add cluster nodes to or remove cluster nodes from cluster 130. Instead, a cluster node may be added and a cluster node may be removed while routing node 132 receives file system requests.

For example, if cluster node 134A is removed from cluster 130, then routing node 132 does not consider cluster node 134A as a potential node to select when routing a file system request from one of client devices 110A-C. As another example, if a new cluster node is added to cluster 130, then routing node 132 considers that new cluster node in selecting a cluster node to which a file system request will be routed.

LOAD BALANCING

In prior approaches, because a file system was exported through a single node, each client device that mounted the file system would direct a file system request to that node. Thus, in a cluster of nodes, one node in the cluster might be processing many file system requests while the other nodes in the cluster remain idle. There was no way to balance the load in the cluster among all nodes in the cluster.

In an embodiment, one or more load balancing techniques are performed on cluster nodes 134A-B. Again, because routing node 132 is the "face" of the cluster in that all file system requests from client devices are directed to routing node 132 and the cluster "behind" routing node 132 is transparent (or invisible) to those client devices, the load on cluster 130 can change without any modifications to the client devices.

Load balancing of cluster 130 involves assigning bundles to each of cluster nodes 134A-B such that each of cluster nodes 134A-B is assigned an equal number of bundles (e.g., 2 bundles each) or such that no cluster node has two or more bundles assigned to it than are assigned to any other cluster node (e.g., 2 bundles to cluster node 134A and 3 bundles to cluster node 134B).

Load balancing of cluster 130 may occur in response to one or more events. Non-limiting examples of such events include the removal of a node from cluster 130, an addition of a new node to cluster 130, the addition of a file system to file systems 140A-C, and the removal of a file system from file systems 140A-C.

Non-limiting examples of load balancing criteria include the number of bundles assigned to each of cluster nodes 134A-B, the number of file system request each of cluster nodes 134A-B is currently processing and/or queuing, and an estimated (or actual) cost of transferring cached data from one cluster node to another cluster node.

For example, if cluster node 134A is assigned five bundles while cluster node 134B is not assigned any bundles (or is assigned one or more bundles for which no file system request has been received for a certain amount of time), then one or more of the five bundles assigned to cluster node 134A are assigned to cluster node 134B. If one of the five bundles is very "active" in that the frequency of file system requests that target the corresponding file system is significantly greater than the frequency associated with the other bundles, then only that "active" bundle may be reassigned to cluster node 134B.

PERFORMANCE TUNING

In an embodiment, routing node 132 applies one or more performance tuning techniques when determining how to route a file system request. Load balancing and performance tuning are related. While load balancing involves distributing load (reflected by the number of bundles assigned to each cluster node) evenly among nodes in a cluster, performance tuning is generally concerned with immediate performance and may involve taking into account additional factors, such as the type of client application that initiated the file system request. Thus, performance tuning tends to be more complicated than load balancing.

Performance tuning may be accomplished using software that monitors certain factors. Performance tuning software executing on routing node 132 (and/or one or more of cluster nodes 134A-B) determines how to re-assign bundles based on certain heuristics. An example of a heuristic is if the CPU (i.e., Central Processing Unit) usage on a particular cluster node reaches 90%, then at least one bundle assigned to the particular cluster node is re-assigned to another cluster node. Alternatively, performance tuning software implements more sophisticated logic, such as a probabilistic model, examples of which include Markov networks and Bayesian networks. Such a probabilistic model accepts multiples inputs, such as I/O throughput, memory (e.g., RAM) usage, CPU usage, Storage Type and Access, access characteristics (e.g., random, sequential, read vs. write), and network usage. Based on the probabilistic model, the performance tuning software might determine if one of cluster nodes 134A-B is likely to have a problem serving additional bundles and might spread out the remaining bundles as well as re-assign currently running bundles to better distribute the load among the entire cluster 130.

With respect to "Storage Type and Access" referred to above, different types of storage have different access characteristics. For example, SSDs, although relatively expensive, are extremely fast for read and write and have very low access times. SSDs are good for data that changes frequently or needs to be accessed very quickly (such as database indexes) or for inventory item counts. Hard disk drives are slower with respect to average access time, but have lots of storage space. Hard disks are good for items such as databases (huge size) or log files (non-random access, low write and read speed). Removable media is good for backups in that they are generally very large in size, but also tend to have slow access times. With respect to access type, "direct attached" (i.e., a drive in the machine, or attached with a short cable) is generally the fastest. Another access type is a Storage Array Network, which is usually fiber channel, attaching large disk arrays to multiple machines. Another access type is network storage, such as ISCSI. Each access type, similar to the media media, is useful for varying types of storage.

For example, cluster node 134A is assigned two bundles: Bundle1 and Bundle2. Bundle1 is exported to ten clients. The exported file system associated with Bundle1 is heavily used with random I/O, which is taxing the storage system. One or more nodes in cluster 130 (e.g., routing node 132) might detect this and move Bundle2 to cluster node 134B (even though cluster node 134B might already be assigned two bundles) so that the client(s) using the exported file system indicated by Bundle2 would not continue to see performance degradation.

Performance tuning can offer several benefits, including additional load balancing features. Because the underlying file system is a cluster file system, the file system can be exported from multiple cluster nodes (including combinations of the entire cluster, a single machine, or any subset) at the same time. This allows the performance tuning system to automatically set up additional exports from other nodes to ensure that the system remains load balanced.

BACKUP ROUTING NODE

In an embodiment, if routing node 132 fails, crashes, or is taken down, then another node assumes that same role. This other node is referred to herein as a "backup routing node." The backup routing node may be one of cluster nodes 134A-B or may be a "stand-by" node whose purpose is to perform the functionality of routing node 132 if routing node 132 is removed. After the backup routing node assumes the role of routing node 132, then subsequent file systems requests that targeted routing node 132 are sent to the backup routing node.

The backup routing node may accomplish this task by causing a mapping between a logical address (associated with routing node 132) and a physical address of routing node 132 to be updated. This mapping may be stored in an ARP (i.e., Address Resolution Protocol) table in a switch or router outside of cluster 130. The mapping is updated by causing the physical address of routing node 132 to be replaced with a physical address of the backup routing node. In this way, any future file system requests that include the logical address as the destination will be routed to the backup routing node.

MULTIPLE NAMESPACE

According to an embodiment of the invention, a cluster of nodes is associated with a multiple namespaces. In other words, client devices discover individual nodes of the cluster and interact ("directly") with those nodes, as opposed to directing all file system requests to a single node, such as routing node 132 in the single namespace implementation described previously. Thus, the client devices can be aware of each node in the cluster. A client device may determine the logical address of each cluster node through a DNS lookup, which resolves a hostname of a cluster node into a logical address.

Figure 3:
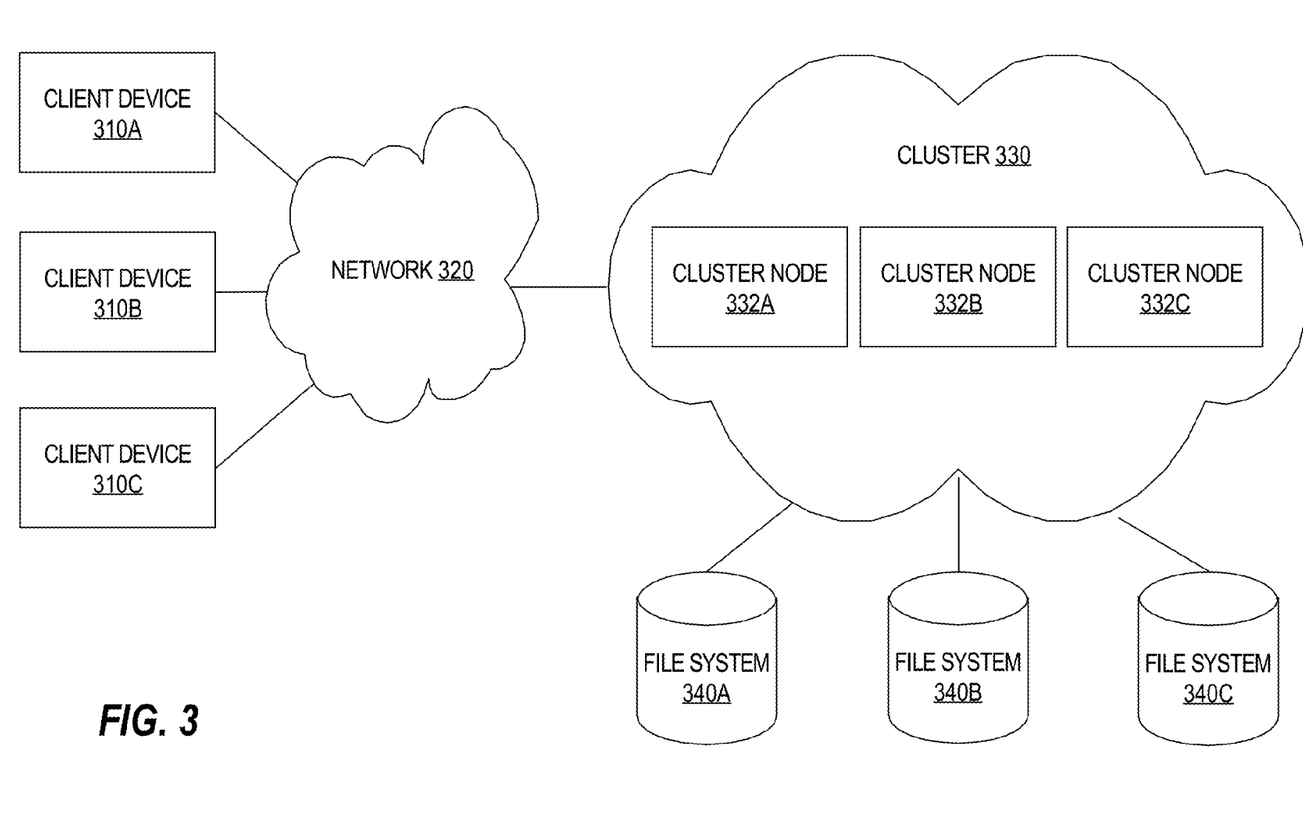
FIG. 3 is a block diagram that depicts an example file system architecture, according to an embodiment of the invention.

FIG. 3 is a block diagram that depicts an example file system architecture 300, according to an embodiment of the invention. File system architecture 300 comprises client devices 310A-C, network 320, cluster 330, and file systems 340A-C. Although only three client devices 310A-C are depicted, other embodiments of the invention may include more or less than three. Similarly, although only three file systems 340A-C are depicted, other embodiments of the invention may include more or less than three.

Client devices 310A-C are configured to generate and transmit file system requests that are sent over network 320 and directed to cluster 330 and processed against one or more of file systems 140A-C.

Network 320 may be implemented by any medium or mechanism that provides for the exchange of data between client devices 310A-C and cluster 330 of FIG. 3. Examples of a network include, without limitation, a network such as a Local Area Network (LAN), Wide Area Network (WAN), Ethernet or the Internet, or one or more terrestrial, satellite or wireless links.

Cluster 330 includes cluster nodes 332A-C. Although only three cluster nodes 332A-C are depicted, other embodiments of the invention may include more or less than three. Each node in cluster nodes 332A-C is configured to process file systems requests against one or more of file systems 340A-C. At least one of file systems 340A-C may be exported through multiple nodes in cluster nodes 332A-C (e.g., at different points in time).

Each cluster node in cluster 330 is associated with a virtual address (referred to herein as a "VIP"). The address is "virtual" because the assignment of a VIP to one cluster node may change. For example, cluster node 332A may be associated with a particular VIP at time 10. Later, at time 20, the particular VIP is assigned to cluster node 332B. Thus, each file system request sent to the particular VIP would be routed to cluster node 332B, instead of cluster node 332A.

Also, one or more nodes in cluster 330 may be associated with multiple virtual addresses. This situation is possible due to the assignment of multiple namespace bundles, described in more detail below.

MULTIPLE NAMESPACE BUNDLES

In the multiple namespace context, a "bundle" is a mapping or an association between a virtual address (or VIP) and a file system. In this context, a bundle may be thought of as a duple: <VIP, file system>. In a related embodiment, a bundle also includes a file system protocol (referred to as an "export"). Two file system requests may target the same file system using the same VIP but using a different export or file system protocol. Thus, a multiple namespace bundle may be thought of as a tuple: <VIP, export, file system>. Multiple namespace bundles may be duples if cluster nodes 332A-C only support a single file system protocol.

In an embodiment, a multiple namespace tuple (or a duple) includes multiple VIPs. In other words, a single file system may be accessible via multiple VIPs.

The assignment of bundles is performed by bundle management software executing on at least a subset of cluster nodes 332A-C. The bundle management software can make intelligent decisions regarding load balancing, performance tuning, and responding to the removal of a node from cluster 330.

FAILOVER

If one of cluster nodes 332A-C is "removed" from the cluster 330 (e.g., cluster node 332A crashes, loses power, or is shut down), then another node (e.g., cluster node 332B) in cluster 330 takes over processing of the removed cluster node.

Figure 4:
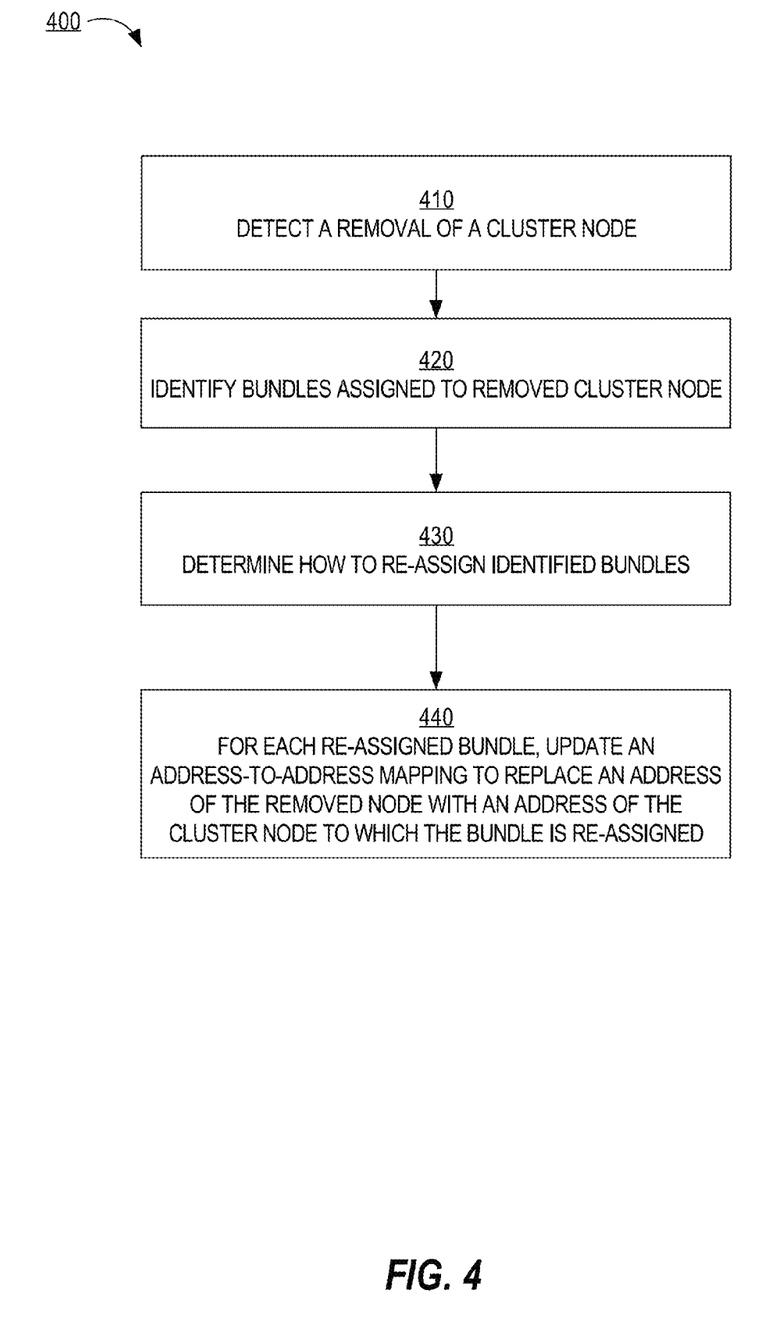
FIG. 4 is a flow diagram that depicts a process for responding to the removal of a cluster node from a cluster, according to an embodiment of the invention.

FIG. 4 is a flow diagram that depicts a process 400 for responding to the removal of a cluster node from cluster 330, according to an embodiment of the invention. In this example, cluster node 332A "fails." Cluster node 332A is assigned one or more bundles. The steps in process 400 may be performed by bundle management software executing on each of cluster nodes 332B and 332C. Also, in this example, bundles assigned to each cluster node in cluster 330 are tuples.

At step 410, cluster node 332B and/or cluster node 332C detects that cluster node 332A has failed. This detection may be based on a "shutdown" message that cluster node 332A sends to each of cluster nodes 332B and 332C in anticipation of a planned shutdown. Alternatively, this detection may be based on cluster node 332B and/or cluster node 332C not receiving a scheduled message or signal from cluster node 332A for a period of time or not receiving, from cluster node 332A, a response to a message sent by cluster node 332B or cluster node 332C.

At step 420, the bundles that are assigned to cluster node 332A are identified. For example, it is determined that bundles 1, 2, and 3 are assigned to cluster node 332A.

At step 430, each bundle identified in step 420 is re-assigned to another node in cluster 330. In the above example, bundles 1 and 2 might be re-assigned to cluster node 332B and bundle 3 might be re-assigned to cluster node 332C. The re-assignment is based on one or more factors. In an embodiment, the bundle re-assignment is made such that all the bundles assigned to all the nodes in cluster 330 are assigned equally or as equally as possible.

For example, the current load of cluster nodes 332B and 332C is determined and used to re-assign bundles 1-3. At the time of cluster node 332A's failure or removal, bundles 4 and 5 are assigned to cluster node 332B and bundles 6, 7, and 8 are assigned to cluster node 332C. Bundles 1-3 may be re-assigned to ensure that each of cluster nodes 332B and 332C are assigned an equal (or near equal) number of bundles. Thus, bundles 1 and 2 may be re-assigned to cluster node 332B and bundle 3 may be re-assigned to cluster node 332C so that each cluster node is assigned four bundles.

In a related embodiment, step 430 comprises identifying one or more characteristics associated with cluster nodes 332B and 332C, the type of client applications that are initiating the file system requests, and/or the type and frequency of file systems requests. The characteristics (e.g., CPU usage, memory usage, network usage) and/or one or more of the other factors discussed above relative to performance tuning may be used to re-assigned the bundles identified in step 420.

At step 440, for each re-assigned bundle, a mapping between each VIP indicated by the bundle and a physical (e.g., MAC) address of cluster node 332A is updated to reflect a different physical address. The different physical address is a physical address of the cluster node to which the bundle was re-assigned in step 430. The mapping may be reflected in an ARP table (e.g., of a switch or router in network 320) that maps logical (e.g., IP) addresses to physical (e.g., MAC) addresses. In this way, any further file system requests whose destination address is the VIP of the re-assigned bundle will be sent to the cluster node to which the bundle was re-assigned. For example, if bundle 3 is re-assigned to cluster node 332C, then any file system requests that were sent with a VIP of bundle 3 as the destination address will be sent to cluster node 332C.

In this way, none of client devices 310A-C is required to know anything about multiple nodes of cluster 330. From the perspective of client devices 310A-C, client devices 310A-C only interact with a single node when attempting to access a particular file system. In other words, a client is not required to have multiple mount points for the same file system.

LOAD BALANCING

Load balancing is also possible in the multiple namespace scenario. If a client device (or, more specifically, a file system client process executing on a client device) mounts a hostname, then load balancing of nodes in cluster 330 is possible. However, if a client device mounts an IP address, then load balancing of the nodes in cluster 330 is not possible.

Figure 5:
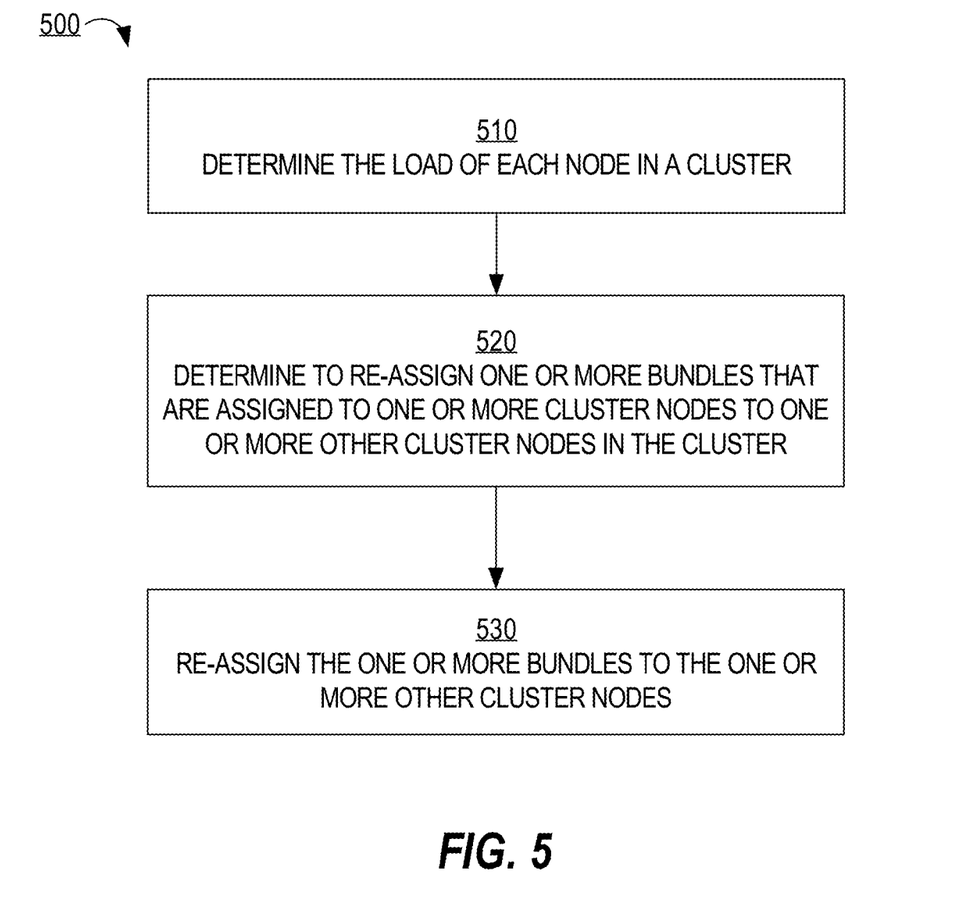
FIG. 5 is a flow diagram that depicts a process for load balancing a cluster of nodes, according to an embodiment of the invention.

FIG. 5 is a flow diagram that depicts a process 500 for load balancing cluster 330, according to an embodiment of the invention. The steps of process 500 may be performed by load balancing software executing on one or more of cluster nodes 332A-C.

At step 510, the current load of each node in cluster 330 is determined. The current load may be reflected in the number of bundles assigned to each cluster node. Additionally or alternatively, the current load may be reflected in the CPU usage of each cluster node, the memory usage of each cluster node, the I/O usage of each cluster node, and/or the type of file system requests currently being serviced or processed by each cluster node.

The current load of each node in cluster 330 may be determined continuously or at regular intervals (e.g., every minute). Additionally or alternatively, the current load may be determined in response to the occurrence of certain events, such as after each new file system request.

At step 520, one or more bundles from one of cluster nodes 332A-C are determined to be re-assigned to one or more other cluster nodes of cluster 330. For example, before a re-assignment, bundles 1-5 are assigned to cluster node 332A, bundles 6-8 are assigned to cluster node 332B, and bundles 9-10 are assigned to cluster node 332C. It is determined that bundle 4 is to be re-assigned to cluster node 332B and bundle 5 is to be re-assigned to cluster node 332C.

At step 530, the bundle re-assignments are made. In an embodiment, for each bundle re-assignment, a hostname-address mapping is updated. The hostname-address mapping may be reflected in a DNS table maintained by a name server in network 320. Such a mapping update is an example of dynamic DNS. The logical address of the hostname-address mapping is replaced with a logical address of the cluster node to which the bundle is re-assigned. Alternatively, a DNS administrator might have configured a DNS alias such that a name server uses round-robin resolution or failover resolution to map to an active host.

In a related embodiment, causing such a hostname-address mapping to be updated is not possible. Instead, a file system client executing on a client device is configured to use a different VIP. The file system client may determine that the time it takes to receive a response to one of its file system requests is too long. Additionally or alternatively, one of cluster nodes 332A-C notifies the file system client to use a different VIP (e.g., that might be identified in a notification) when accessing the same file system.

Given the above example, for bundle 4, a hostname-address mapping (that indicates a logical address of cluster node 332A) is updated to indicate a logical address of cluster node 332B. Client devices that have already had the hostname of the updated hostname-address mapping resolved to the logical address of cluster node 332A will continue to send file system requests to the logical address of cluster node 332A. However, over time, those client devices may "forget" the logical address; in which case, those client devices will cause the hostname to be "re-resolved," in which case the "new" logical address (i.e., of cluster node 332B) will be discovered. Also, immediately after the mapping update, any future name resolution requests that identify that hostname will resolve to the logical address of cluster node 332B.

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
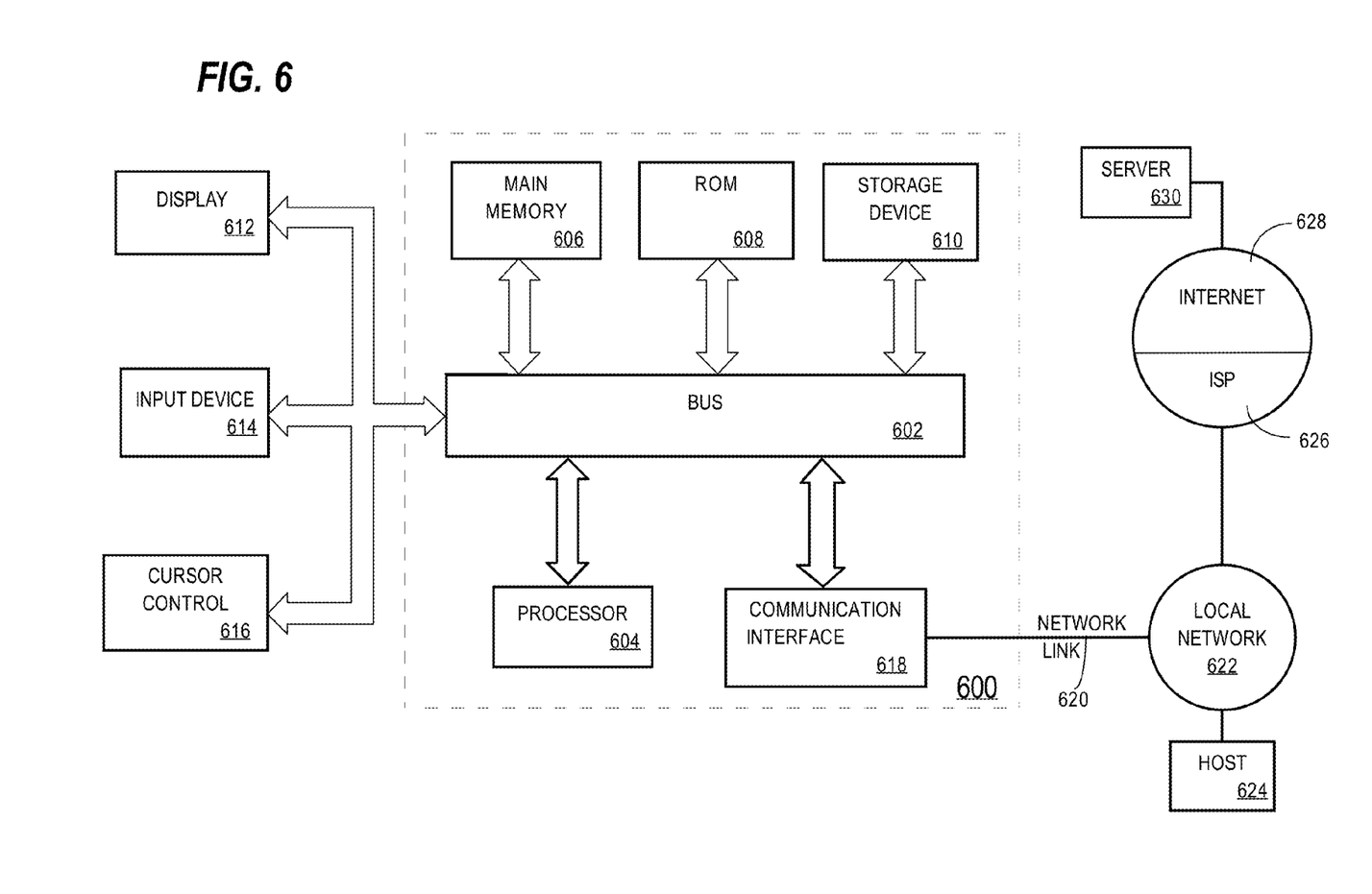
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, from a client device that submits file system requests according to one or more file system protocols, over a network, at a routing node, a first file system request that uses a particular file system protocol,
    determining, by the routing node, which cluster node, of a plurality of cluster nodes that implement the one or more file system protocols, is to process the first file system request;
    wherein determining which cluster node is to process the first file system request comprises determining, from among the plurality of cluster nodes, a first cluster node;
    in response to determining the first cluster node:
        sending, by the routing node, the first file system request to the first cluster node, wherein the first cluster node processes the first file system request, and
        storing data that indicates that a file system request from the client device was sent to the first cluster node;
    after sending the first file system request to the first cluster node, receiving, from the client device, at the routing node, a second file system request that uses the particular file system protocol;
    determining, by the routing node, which cluster node, of the plurality of cluster nodes, is to process the second file system request;
    wherein determining which cluster node is to process the second file system request comprises determining, based at least in part upon the data that indicates that a file system request from the client device was sent to the first cluster node, a second cluster node that is different than the first cluster node;
    in response to determining the second cluster node, sending, by the routing node, the second file system request to the second cluster node, wherein the second cluster node processes the second file system request.

2. The method of claim 1, wherein:
    the first file system request includes an address that is associated with the client device that sent the first file system request;
    the method further comprising, before sending the first file system request to the first cluster node, replacing, by the routing node, the address with an address associated with the first cluster node.

3. The method of claim 1, further comprising:
    receiving, from the first cluster node, a response to the first file system request;
    sending, to the client device that sent the first file system request, a file system response that is based on the response from the first cluster node.

4. The method of claim 3, wherein:
    the response includes an address that is associated with the first cluster node;
    the method further comprising, before sending the file system response to the client device that sent the first file system request, replacing, by the routing node, the address with an address that is associated with the routing node.

5. The method of claim 1, further comprising:
    determining that the routing node is unable to process file system requests; and
    in response to determining that the routing node is unable to process file system requests, causing subsequent file system requests to be directed to a second routing node that is different than the routing node.

6. The method of claim 5, wherein:
    causing subsequent file system requests to be directed to the second routing node comprises causing a mapping between a particular logical address and a first physical address to be updated;
    the first physical address is of the routing node;
    the mapping is updated by replacing the first physical address with a second physical address of the second routing node.

7. The method of claim 1, wherein:
determining which cluster node of the plurality of cluster nodes is to process the first file system request is based on one or more factors associated with each cluster node in the plurality of cluster nodes;
the one or more factors associated with each cluster node of the plurality of cluster nodes indicates a number of bundles that are assigned to said each cluster node.

8. The method of claim 1, wherein:
determining which cluster node of the plurality of cluster nodes is to process the first file system request is based on one or more factors associated with each cluster node in the plurality of cluster nodes;
the one or more factors associated with each cluster node of the plurality of cluster nodes indicates a current load of said each cluster node;
the current load of said each cluster node comprises one or more of CPU usage of said each cluster node, memory usage of said each cluster node, a number of file systems requests queued at said each cluster node, or I/O usage of said each cluster node.

9. The method of claim 1, wherein multiple cluster nodes of the plurality of cluster nodes export a particular file system of one or more file systems.

10. The method of claim 1, wherein:
the routing node and the plurality of cluster nodes are within the same network;
at least one file system is exported through two of the plurality of cluster nodes.

11. The method of claim 1, further comprising:
storing bundle assignment data that indicates an assignment of each bundle of a plurality of bundles to a cluster node of the plurality of cluster nodes;
wherein the bundle assignment data indicates a first assignment of a first bundle, of the plurality of bundles, to the first cluster node;
wherein the bundle assignment data indicates a second assignment of a second bundle, of the plurality of bundles, to the second cluster node;
updating the bundle assignment data to indicate a third assignment of the first bundle to a third cluster node that is different than the first cluster node.

12. One or more storage media storing instructions which, when executed by one or more computing devices, cause:
receiving, from a client device that submits file system requests according to one or more file system protocols, over a network, at a routing node, a first file system request that uses a particular file system protocol,
determining, by the routing node, which cluster node, of a plurality of cluster nodes that implement the one or more file system protocols, is to process the first file system request;
wherein determining which cluster node is to process the first file system request comprises determining, from among the plurality of cluster nodes, a first cluster node;
in response to determining the first cluster node:
sending, by the routing node, the first file system request to the first cluster node, wherein the first cluster node processes the first file system request,
storing data that indicates that a file system request from the client device was sent to the first cluster node;
after sending the first file system request to the first cluster node, receiving, from the client device, at the routing node, a second file system request that uses the particular file system protocol;
determining, by the routing node, which cluster node, of the plurality of cluster nodes, is to process the second file system request;
wherein determining which cluster node is to process the second file system request comprises determining, based at least in part upon the data that indicates that a file system request from the client device was sent to the first cluster node, a second cluster node that is different than the first cluster node;
in response to determining the second cluster node, sending, by the routing node, the second file system request to the second cluster node, wherein the second cluster node processes the second file system request.

13. The one or more storage media of claim 12, wherein:
the first file system request includes an address that is associated with the client device that sent the first file system request;
the instructions, when executed by the one or more computing devices, further cause, before sending the first file system request to the first cluster node, replacing, by the routing node, the address with an address associated with the first cluster node.

14. The one or more storage media of claim 12, wherein the instructions, when executed by the one or more computing devices, further cause:
receiving, from the first cluster node, a response to the first file system request;
sending, to the client device that sent the first file system request, a file system response that is based on the response from the first cluster node.

15. The one or more storage media of claim 14, wherein:
the response includes an address that is associated with the first cluster node;
the instructions, when executed by the one or more computing devices, further cause, before sending the file system response to the client device that sent the first file system request, replacing, by the routing node, the address with an address that is associated with the routing node.

16. The one or more storage media of claim 12, wherein the instructions, when executed by the one or more computing devices, further cause:
determining that the routing node is unable to process file system requests; and
in response to determining that the routing node is unable to process file system requests, causing subsequent file system requests to be directed to a second routing node that is different than the routing node.

17. The one or more storage media of claim 16, wherein:
causing subsequent file system requests to be directed to the second routing node comprises causing a mapping between a particular logical address and a first physical address to be updated;
the first physical address is of the routing node;
the mapping is updated by replacing the first physical address with a second physical address of the second routing node.

18. The one or more storage media of claim 12, wherein:
determining which cluster node of the plurality of cluster nodes is to process the first file system request is based on one or more factors associated with each cluster node in the plurality of cluster nodes;
the one or more factors associated with each cluster node of the plurality of cluster nodes indicates a number of bundles that are assigned to said each cluster node.

19. The one or more storage media of claim 12, wherein:
determining which cluster node of the plurality of cluster nodes is to process the first file system request is based on one or more factors associated with each cluster node in the plurality of cluster nodes;
the one or more factors associated with each cluster node of the plurality of cluster nodes indicates a current load of said each cluster node;
the current load of said each cluster node comprises one or more of CPU usage of said each cluster node, memory usage of said each cluster node, a number of file systems requests queued at said each cluster node, or I/O usage of said each cluster node.

20. A system comprising:
a routing node that comprises one or more processors and one or more storage media storing instructions;
a plurality of cluster nodes;
wherein the instructions, when executed by the one or more processors, cause:
receiving, from a client device, over a network, at the routing node, a first request, determining, by the routing node, which cluster node, of the plurality of cluster nodes, is to process the first request;
wherein determining which cluster node is to process the first request comprises determining, from among the plurality of cluster nodes, a first cluster node;
in response to determining the first cluster node:
sending, by the routing node, the first request to the first cluster node that processes the first request, and
storing data that indicates that a request from the client device was sent to the first cluster node;
after sending the first request to the first cluster node, receiving, from the client device, at the routing node, a second request that is different than the first request;
determining, by the routing node, which cluster node, of the plurality of cluster nodes, is to process the second request;
wherein determining which cluster node is to process the second request comprises determining, based at least in part upon the data that indicates that a request from the client device was sent to the first cluster node, a second cluster node that is different than the first cluster node;
in response to determining the second cluster node, sending, by the routing node, the second request to the second cluster node that processes the second request.

* * * * *

UNITED STATES PATENT AND TRADEMARK OFFICE
CERTIFICATE OF CORRECTION

PATENT NO. : 9,923,958 B1  
APPLICATION NO. : 15/804203  
DATED : March 20, 2018  
INVENTOR(S) : Glover et al.

Page 1 of 1

It is certified that error appears in the above-identified patent and that said Letters Patent is hereby corrected as shown below:

In the Specification

In Column 1, Line 41, delete "exports" and insert -- exportfs --, therefor.

In Column 1, Line 48, delete "nfsd)" and insert -- rpcbind) --, therefor.

In Column 7, Line 47, delete "be" and insert -- been --, therefor.

In Column 9, Line 27, after "the" delete "media".

In Column 11, Line 54, delete "332A' s" and insert -- 332A's --, therefor.

Signed and Sealed this
Second Day of February, 2021

Drew Hirshfeld
*Performing the Functions and Duties of the
Under Secretary of Commerce for Intellectual Property and
Director of the United States Patent and Trademark Office*